Sept. 27, 1955  L. J. ANDERSON  2,719,015
BARRAGE BALLOON SAFETY VALVE
Filed May 28, 1951
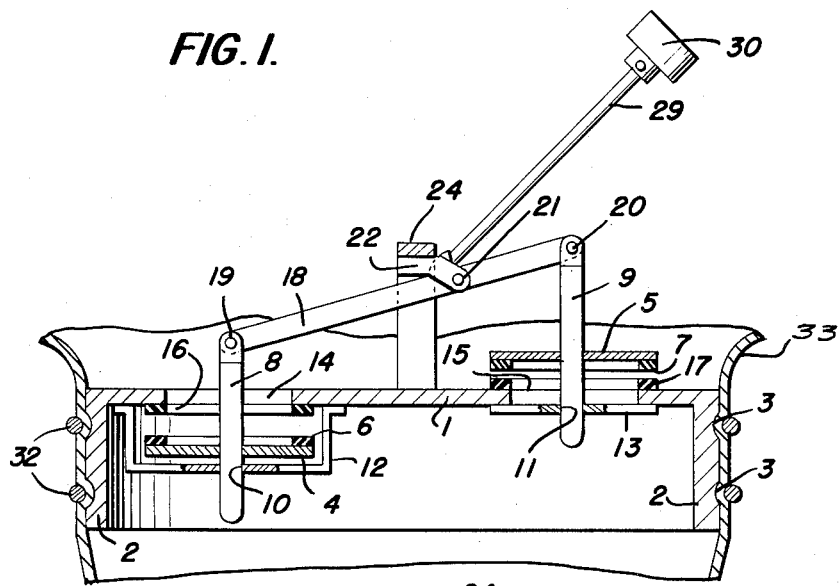
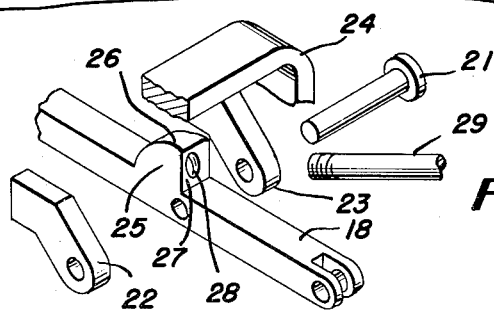
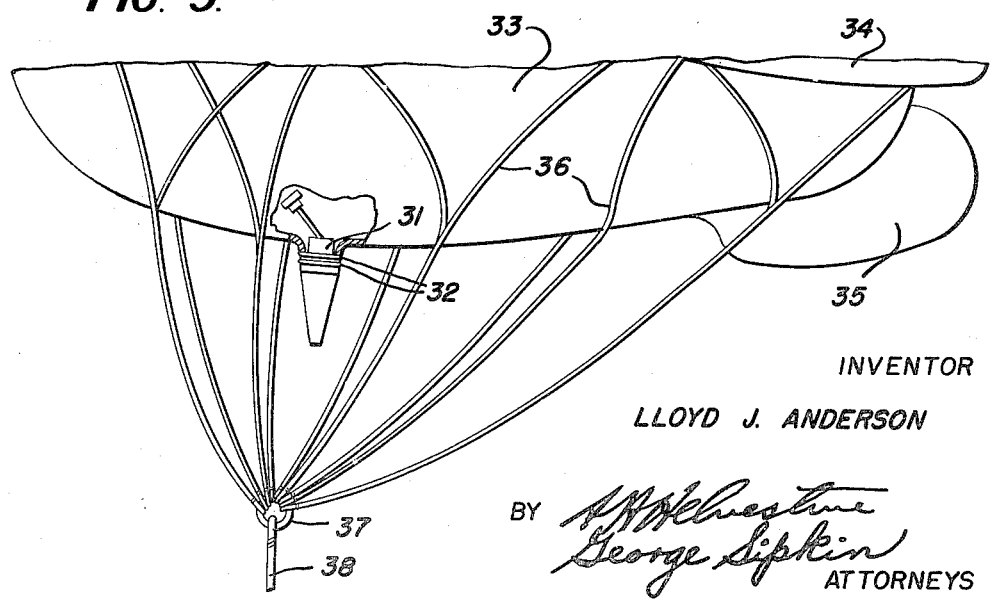
INVENTOR
LLOYD J. ANDERSON
BY
ATTORNEYS

United States Patent Office 2,719,015
Patented Sept. 27, 1955

2,719,015

BARRAGE BALLOON SAFETY VALVE

Lloyd J. Anderson, San Diego, Calif.

Application May 28, 1951, Serial No. 228,727

4 Claims. (Cl. 244—99)

(Granted under Title 35, U. S. Code (1952), sec. 266)

The invention described herein may be manufactured or used by or for the Government of the United States of America for governmental purposes without the payment of any royalties thereon or therefor.

This invention relates to safety valves for balloons and more particularly to safety valves for barrage balloons which are automatic in operation both in the escape of excess gas when the gas pressure in the balloon rises above a predetermined magnitude and in the escape of gas from the balloon to cause a descent thereof at a safe rate.

The general object of the invention is to provide a valve for a balloon which valve is normally held in closed position by gravitational action.

It is also an object of the invention to provide a dual valve the discs of which move in opposite directions in moving from open to closed positions and vice versa.

It is a further object of the invention to provide a safety valve in which the mechanism is simple in construction of relatively light weight.

Other objectives such, for example, as low cost and relative ease of production will be apparent from the following description and from the drawings, hereto appended, which are merely illustrative of one embodiment of the invention.

In these drawings:

Figure 1 is a transverse vertical sectional view through the valve. It is partly in section and partly in elevation;

Figure 2 is an exploded view of the pivot or fulcrum assemblage of the valve operating lever and its supporting and operating parts; and Figure 3 is a view of a part of a barrage balloon. It is partly cut away to show the operative location of the valve of this invention in the appendix or throat of the balloon.

The attainment of the above objectives has been accomplished by this inventor by means of a particularly constructed valve, a preferred embodiment of which is illustrated in the drawings wherein Fig. 1 a valve of circular or cylindrical configuration is shown as comprising a valve base plate 1 which is provided with a peripheral annular flange 2. The exterior surface of this flange is provided with continuous grooves 3 which function in cooperation with tie-lines 32 to seal the valve in the appendix of a balloon with respect to the fabric thereof as shown at 31 in Fig. 3.

The valve, which is of the dual type, further comprises two valve discs 4 and 5 which are respectively provided with resilient valve seat gaskets 6 and 7. Valve discs 4 and 5 are both provided with stems 8 and 9 which extend axially above and below said discs (as shown in Fig. 1). These stems on one side of the discs cooperate with guides 10 and 11 in brackets 12 and 13 and function to substantially center the valve discs on openings 14 and 15 in valve base plate 1. Said openings 14 and 15 are provided with annular, resilient valve seat gaskets 16 and 17 which coact with gaskets 6 and 7 on the valve discs 4 and 5 to make a gastight seal when said valve discs are moved into contact therewith. Valve stems 8 and 9 are pivoted at their upper ends to the ends of lever 18 as shown at 19 and 20. Lever 18 is rotatably mounted on pivot pin 21 which is supported by bearing arms 22 and 23 which are securely mounted on the underside of transversely extending bracket 24. Lever 18 is provided with a lug 25 which is positioned at approximately two-thirds of the distance from pivot end 19 to end 20. The upper surface of lug 25 is arced as at 26 on a radius to the axis of pivot pin 21. The curvature of arced surface 26 provides a clearance for lug 25 with respect to bracket 24 as lever 18 pivots about pin 21. The forward face 27 of lug 25 may be inclined at about 60° to the top surface of lever 18. An interiorly threaded hole 28 extends into lug 25 from about the center of and normal to face 27. Shaft 29 threadedly engages lug 25 in hole 28 and is provided with a counterweight 30 which may be adjustably mounted on the outer end thereof.

The valve, as above stated, is positioned in the appendix of the balloon as shown at 31 in Fig. 3. The valve is held in gastight, sealed relationship to the fabric of the appendix by the tie-lines 32.

The part of the barrage balloon shown in Fig. 3 at 33 is that of the conventional type of such a balloon. It is characterized by the usual vanes or ailerons 34, 35 at the rear of the balloon which function to hold the balloon on an approximately level keel and nosed into the wind. The balloon is held in the usual network of ropes 36 which may be gathered in a ring 37 to which the ground connecting cable 38 is attached.

In operation the balloon normally rides on an even keel. Under this condition the moment exerted by counterweight 30 about lever pivot 21 holds valves 4 and 5 closed. If the gas pressure within the balloon rises above the desired or predeterminedly safe pressure, valve 4, because of its longer moment arm about pivot 21 with respect to that of valve 5 thereabout, will rotate lever 18 in a counterclockwise direction about pivot 21 and will cause both valves to be unseated; thereby allowing the excess of gas to escape until the pressure is reduced to a point approximately that of the predetermined pressure whereat the valves move to closed position. This is the safety valve feature of the invention. If the ground cable 38 breaks, the nose of the balloon rises and the moment exerted by counterweight 30 about pivot 21 becomes less and less until the moment exerted by valve 4 becomes greater than the combined moments of the counterweight and valve 5. When this state of unbalance is reached the valves open thereby allowing the gas in the balloon to gradually escape. The balloon descends and may be retrieved without injury. Experience has shown that the valve deflates the balloon in about three or four minutes.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A dual acting safety valve for balloons comprising a disc plate, an annular flange integral with said disc plate extending from the periphery thereof, a pair of valve seat openings positioned in said disc plate in diametrically opposed relationship to each other, a pair of valve discs positioned to coact with said valve seat openings from opposite sides thereof to open and close the same, a stem extending through and securely attached to each of said valve discs, guide means mounted on said disc plate adapted to coact with each of said stems to approximately center said valve discs with respect to said openings, a lever pivotally connected to one end of each valve stem, a pivot support for said lever positioned at a point along the longitudinal axis of said lever nearer to one valve stem than to the other and counterweight means adjustably mounted on a shaft, said shaft engaging said lever near said pivot support at a vertical angle to the longitudinal axis of said lever, said counterweight and shaft extending from said pivot support toward the nearer valve stem whereby, when said disc plate is in an approximately level position, said counterweight by gravitational force is operative to move said valve discs to closure of said valve seat openings.

2. A dual acting safety valve for balloons comprising a disc plate, an annular flange integral with said disc plate extending on one side of said disc plate from the periphery thereof, two valve seats positioned around openings in said disc plate in diametrically opposed relationship, two valve discs positioned to coact with said valve seats from opposite sides of said disc plate to open and close said openings, a stem extending through and securely attached to each of said valve discs, guide means attached to said disc plate adapted to coact with each of said stems to approximately center said discs with respect to said valve seats and openings, a lever pivotally connected to one end of each stem, a pivot support for said lever including a pivot pin extending transversely through said lever and dividing said lever into legs of lengths in the ratio of about one to two, said pivot pin journaled in arms extending from and securely attached to a bridge bracket extending transversely of said lever and attached to said disc plate and counterweight means adjustably mounted on a shaft engaging said lever near said pivot support at a vertical angle of about 30° to the longitudinal axis of said lever, said counterweight and shaft extending from said pivot support in the vertical plane through the longitudinal axis of said lever over the shorter leg thereof whereby when said valve disc plate is in an approximately level position said counterweight by gravitational force exerts a moment about said pivot support biasing said valve discs to closure of said valve seat openings and whereby when gas pressure within said balloon increases a certain amount the gas pressure applied on the valve disc having the longer lever leg exerts a greater moment about said pivot support than the sum of the opposing moments exerted by said counterweight and the other valve disc thereby moving the said valve discs from their respective seats and permitting the excess of gas in the balloon to escape.

3. A dual acting safety valve for balloons comprising a disc plate, an annular flange integral with said disc plate extending on one side of said disc plate from the periphery thereof, two valve seats positioned around openings in said disc plate in diametrically opposed relationship, two valve discs positioned to coact with said valve seats from opposite sides of said disc plate to open and close said openings, a stem extending through and securely attached to each of said valve discs, guide means attached to said disc plate adapted to coact with each of said stems to approximately center said discs with respect to said valve seats and openings, a lever pivotally connected to one end of each stem, a pivot support for said lever including a pivot pin extending transversely through said lever and dividing said lever into legs of lengths in the ratio of about one to two, said pivot pin journaled in arms extending from and securely attached to a bridge bracket extending transversely of said lever and attached to said disc plate and counterweight means adjustably mounted on a shaft engaging said lever near said pivot support at a vertical angle of about 30° to the longitudinal axis of said lever, said counterweight and shaft extending from said pivot support in the vertical plane through the longitudinal axis of said lever over the shorter leg thereof whereby when said disc plate assumes a position out of the horizontal the moments exerted by said counterweight and the valve disc having the shorter lever leg become less at a greater rate than moment exerted by the valve disc having the longer leg thereby causing the valve discs to be moved from their respective seats and the gas within the balloon to escape.

4. A dual acting safety valve for a tail heavy balloon having a network of ropes and ground connecting cable to cause said balloon to float on an approximately level keel, said valve comprising a disc plate connected in gas sealing relationship with said balloon and in substantially horizontal position when said balloon floats on level keel, a pair of valve seat openings positioned in said disc plate in diametrically opposed relationship to each other and mutually spaced along a line parallel to the longitudinal axis of said balloon, a pair of valve disc means positioned to coact with said seat openings from opposite sides thereof to open and close the same, a lever extending in a vertical plane passing through the longitudinal axis of said balloon and pivotally connected to each disc means, a pivot support for said lever positioned at a point along the longitudinal axis of said lever nearer to the disc means further noseward of said balloon than the other disc means so as to provide lever arms of lesser and greater length, counterweight means on said lesser arm, said lever arm of greater length disengaging its corresponding valve disc means from its valve seat opening in a direction outwardly from the interior of said balloon in opposition to said counterweight means to provide a safety valve release when the pressure of gas within said balloon exceeds a predetermined maximum, said counterweight means urging both said disc means to closed position with a varying force which rapidly decreases as said balloon noses upwardly from level keel position upon the breaking of said cable, said counterweight means including a weight positioned horizontally forward of and substantially above said pivot support when said balloon is on level keel, whereby the upward movement of the balloon nose which occurs upon breaking of said cable will rapidly decrease the effective lever arm of said weight and allow both said disc means to move to open position under force of the gas pressure within said balloon.

References Cited in the file of this patent

UNITED STATES PATENTS

| | | |
|---|---|---|
| 7,207 | Bell | Mar. 26, 1850 |
| 113,517 | Holly | Apr. 11, 1871 |
| 616,100 | Harrison | Dec. 20, 1898 |
| 975,958 | Johnson | Nov. 15, 1910 |
| 1,181,352 | Smith | May 2, 1916 |
| 1,454,298 | Stahl | May 8, 1923 |
| 1,522,715 | Durr | Jan. 13, 1925 |